Figure 1:
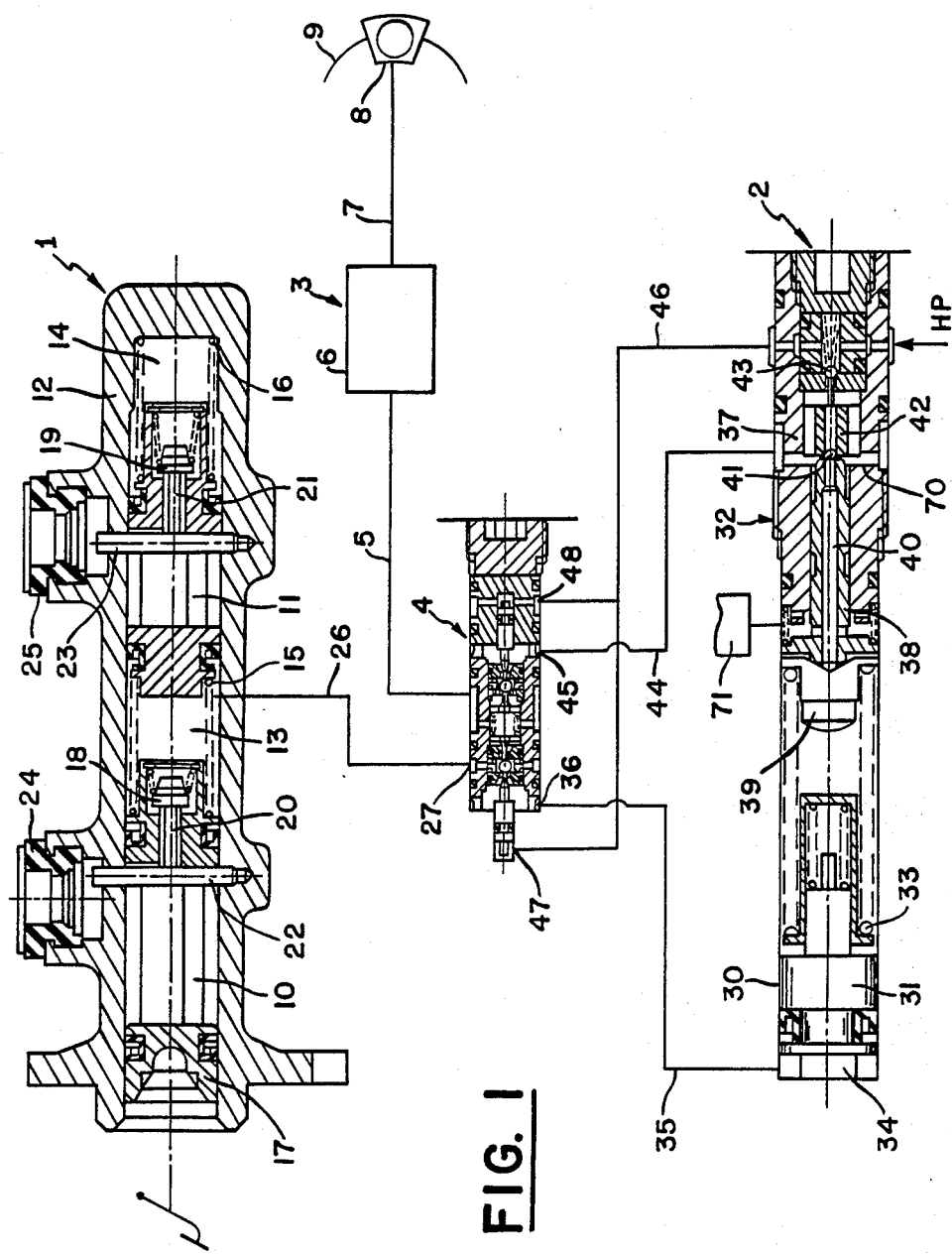

United States Patent [19]

Tourneur et al.

[11] Patent Number: 4,858,737
[45] Date of Patent: Aug. 22, 1989

[54] HYDRAULIC BRAKING DEVICE FOR AUTOMOBILE VEHICLE

[75] Inventors: Roger Tourneur, Pontault Combault; Joël Vasselet, Chelles, both of France

[73] Assignee: Bendix France, Drancy, France

[21] Appl. No.: 186,505

[22] Filed: Apr. 26, 1988

[30] Foreign Application Priority Data

Apr. 28, 1987 [FR] France .................. 87 05974

[51] Int. Cl.$^4$ .................. B60T 13/12; B60T 15/36; B60T 17/18
[52] U.S. Cl. .................. 188/358; 60/565; 60/582; 60/591; 91/460; 303/13; 303/14; 303/52; 303/113; 303/84.1; 303/92
[58] Field of Search .................. 60/565, 566, 579, 582, 60/591; 91/460; 188/355–360, 151 A, 345; 303/13–18, 84.1, 84.2, 50–56, 113–119, 110, 25–27, 10–12, 6.01, 92

[56] References Cited

U.S. PATENT DOCUMENTS

| | | | |
|---|---|---|---|
| 3,503,655 | 3/1970 | Heimler | 303/114 |
| 3,805,525 | 4/1974 | Kito et al. | 60/566 X |
| 3,827,759 | 8/1974 | Belart | 303/114 |
| 4,129,341 | 12/1978 | Pauwels | 303/115 |
| 4,428,623 | 1/1984 | Bertling et al. | 303/114 |
| 4,622,814 | 11/1986 | Kervagoret | 60/566 X |
| 4,637,662 | 1/1987 | Brown | 303/116 X |
| 4,641,497 | 2/1987 | Kervagoret | 60/565 X |
| 4,651,528 | 3/1987 | Carré et al. | 60/556 |
| 4,671,168 | 6/1987 | Sauvee et al. | 91/460 X |
| 4,706,460 | 11/1987 | Kervagoret | 60/565 |
| 4,709,550 | 12/1987 | Sauvee et al. | 91/460 X |
| 4,729,223 | 3/1988 | Kervagoret | 60/566 |

FOREIGN PATENT DOCUMENTS 0147255 7/1985 European Pat. Off. .
2485458 12/1981 France .

Primary Examiner—Douglas C. Butler
Attorney, Agent, or Firm—Larry J. Palguta; Ken C. Decker

[57] ABSTRACT

The device comprises a tandem master cylinder, a booster high pressure fluid distributor, 2, a valve mechanism 4 to interconnect the master cylinder and the distributor selectively to a braking circuit. The high pressure circuit is connected to the pipeline 46 which controls the plungers 52, 56 acting on the ball valves 50, 51 respectively. In the event of failure of the high pressure circuit, the valves 50, 51 connect the pipeline 26 directly supplied by the master cylinder and the pipeline 5 which supplies a brake motor 8 for a wheel. The device may be utilized in an anti-skid circuit.

8 Claims, 2 Drawing Sheets

HYDRAULIC BRAKING DEVICE FOR AUTOMOBILE VEHICLE

The present invention concerns a hydraulic braking device, particularly for an automotive vehicle and, more especially, to such a device fitted with means permitting the safety of the operation of the device to be ensured in the event of failure of a source supplying booster high pressure fluid during braking.

A hydraulic amplifier for braking is known from U.S. Pat. No. 4,651,528 comprising a body, a first member movable in the body due to the effect of the position of a brake pedal, between a first position making a first chamber, connected to a braking circuit and to the inside of the body, communicate with a low pressure reservoir, and isolating this chamber from a high pressure source, and a second position isolating the chamber from the low pressure reservoir. This hydraulic amplifier comprises a second chamber formed in the body, a circuit making this second chamber communicate with the low pressure reservoir, and a valve means sensitive to the pressure of the high pressure source normally closing this circuit due to the effect of the pressure of the high pressure source. This amplifier, in the event of failure of the high pressure circuit, functions like a normal master cylinder. It is of monobloc construction and, because of this, it is meant to be combined with a braking device designed to receive it and not to a device comprising a master cylinder and an individualized hydraulic pressure distributor, of types known per se.

Thus the object of the present invention is to make a hydraulic braking device fitted with means ensuring safety of braking in the event of failure of the high pressure circuit, these means being designed to integrate simply with the device when this comprises an individualized master cylinder and pressure booster distributor known per se.

This object of the invention is achieved with a hydraulic braking device comprising a master cylinder controlled by a pedal, a braking circuit supplying at least one brake motor, a booster fluid distributor supplied by a high pressure fluid circuit and controlled by the master cylinder to connect this fluid circuit to the braking circuit when the pedal is actuated, and a valve means interconnecting the master cylinder, the distributor and the braking circuit to isolate the braking circuit from the high pressure circuit in the event of failure of this circuit and then to connect the braking circuit directly to the master cylinder. According to the invention, the valve means comprises a first valve connected to the master cylinder, to the braking circuit and to a control input for the distributor so as to connect, in a first state, the master cylinder to this control input and to isolate the master cylinder from the braking circuit and, in a second state, to connect the master cylinder to the braking circuit and to isolate the control input for the distributor from the master cylinder, a second valve connected to an outlet of high pressure fluid from the distributor and to the braking circuit so as to connect, in a first state, this outlet to the braking circuit and so as to isolate, in a second state, this circuit from this outlet, these two valves being controlled by the high pressure fluid circuit to pass simultaneously from their first state to their second state in the event of failure of this circuit.

Figure 2:
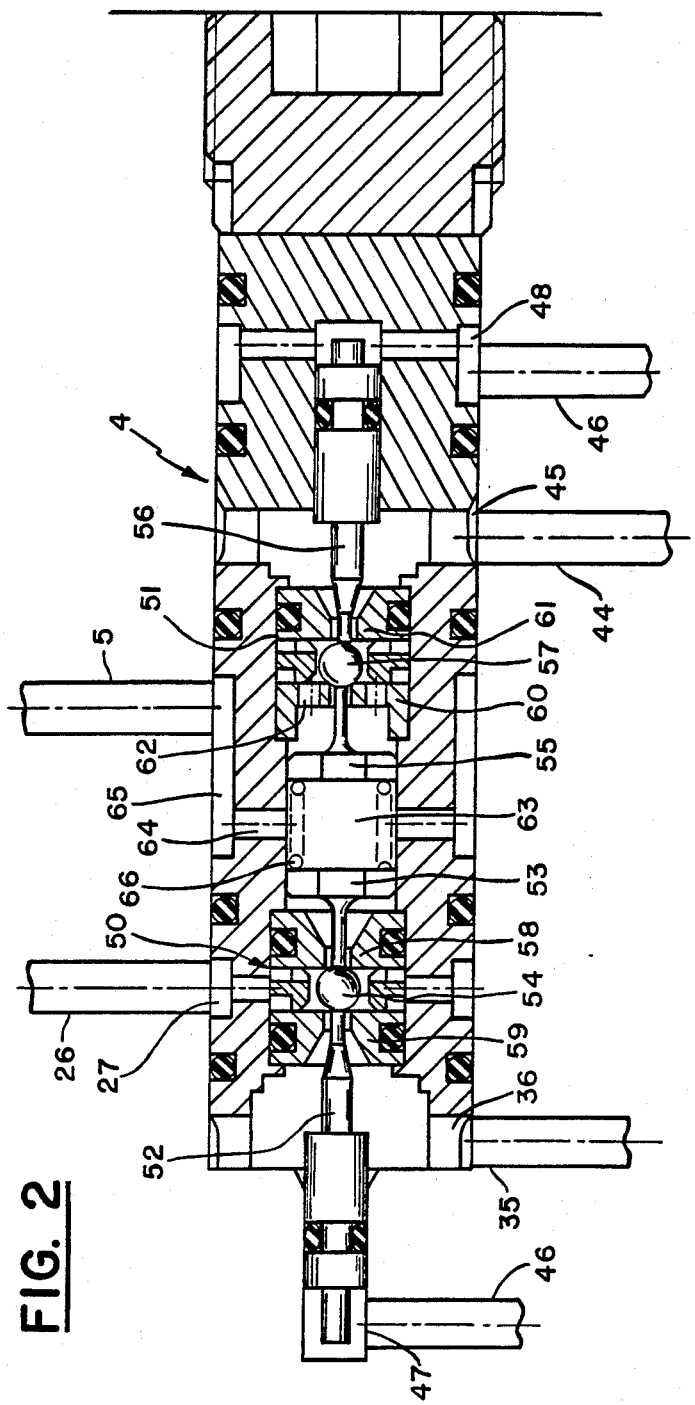

In the attached drawing, given as an example only:

FIG. 1 is a diagrammatic view of the braking device according to the invention, and FIG. 2 is a view in axial cross-section of a valve means incorporated in the device of FIG. 1.

Reference is made to FIG. 1 of the drawing where the braking device according to the invention is shown in diagrammatic form, which comprises essentially a "tandem" master cylinder 1, a pressure booster distributor 2 of the type known by the name of "full power" and a braking circuit 3, interconnected by a valve means 4. The braking circuit 3 comprises a pipeline 5 from the valve means 4 to supply, through a modulator group 6 and another pipeline 7, a brake motor 8 acting on a wheel 9 of, for example, an automotive vehicle. Only a single brake motor is shown for clarity of the drawing but it is evidently clear that the pipeline 5 would be able to supply conventionally two brake motors, each one joined, for example to diagonally opposed wheels of the vehicle. As is well known, the "tandem" master cylinder 1 is able to supply two diagonally opposed braking circuits, although only one of these circuits is partially shown in the drawing.

The master cylinder 1 is of a known type and comprises two in-line pistons 10 and 11 demarcating two pressure chambers 13 and 14 in a body 12. Some springs 15 and 16 function respectively in compression in these chambers 13 and 14. The pistons 10 and 11 may be moved towards the right (as seen in FIG. 1) by a brake pedal acting on a movable end fitting 17 formed on the left hand end of the piston 10 to move in a bore drilled in the body 12. Some valves 18 and 19 are carried respectively by the pistons 10 and 11, these valves being held open by some pins 22, 23 against which the bottom ends 20, 21 of the valves 18, 19 respectively rest, when the pistons take up their rest position shown in the figure, even when no action at all is applied on the brake pedal. The chambers 13 and 14 are thus placed in communication with the brake fluid low pressure reservoirs mounted respectively on seats 24, 25. A pipeline 26 connects the chamber 13 to an inlet 27 of the valve means 4. In the same way, and even though this is not shown in the drawing, the chamber 14 could be connected to another valve means identical to the valve means 4, for the supply of a second braking circuit joined to the other two wheels of the vehicle.

The distributor of booster fluid 2 is also of a known type. It comprises essentially a body drilled with a bore 30 in which a control piston 31 and a piston means 32 are fitted in line. A spring 33 is fitted in an intermediate chamber between these two members to maintain them apart one from the other. A chamber 34 located to the left of the piston 31 in the bore 30 is connected to an orifice of the valve means 4 by a pipeline 35. The control piston 31 is movable axially in the bore 30 due to the action of a pressure established in the chamber 34 and connected by the pipeline 35, pressure emanating from the master cylinder 1, as will be explained in greater detail later on. The movements of the control piston are transmitted by the spring 33, which is very stiff to the piston means 32. The piston means 32 is itself made up of a fixed sleeve 37 and a movable slide valve 38 movable in this sleeve due to the action of the control piston, action applied by the spring 33 to a ball-head thrust 39 which rests on the left hand end of the slide valve 38. The slide valve 38 is itself drilled axially with a channel 40. This channel 40 opens out at its right hand end, as seen in the figure, opposite a ball 41 carried by a needle-pointed core 42 movable along the axis of the bore 30. A ball inlet valve 43 is placed in line with the core needle 42 in the bore 30.

The high pressure fluid circuit of the device according to the invention comprises a source of high pressure HP fluid which supplies an inlet orifice of the distributor 2. This orifice opens out into the inlet valve 43 which is closed normally by a ball loaded by a spring. As will be seen later on in detail, when a pressure is exerted on the brake pedal, the pressure of the fluid in the chamber 34 increases, which has the effect of moving the control piston 31 and the slide valve 38 to the right which then pushes back the needle-pointed core 42 via the ball 41, the needle of this core lifting the ball of the valve 43 from its seat to place the source of high pressure in communication with a pipeline 44 connected to an orifice 45 of the valve means 4.

The high pressure fluid circuit of the device according to the invention also comprises a pipeline 46 connected to the source of high pressure HP through the high pressure side of the valve 43. The pipeline 46 is connected to two orifices 47 and 48 of the valve means 4.

Reference is now made to FIG. 2 to describe the valve means 4 which interconnects the master cylinder, the distributor and the braking circuit of the device according to the invention in more detail. The valve means 4 comprises essentially the first and second ball valves respectively 50, 51, the plungers 52 and 53 acting in the opposite direction on the ball 54 of the valve 50 whereas the plungers 55 and 56 also act in the opposite direction on the ball 57 of the valve 51. The valve 50 thus happens to be in a first state when the plunger 52 presses the ball 54 against a seat 58 whereas this valve happens to be in a second state when the plunger 53 presses the ball 54 onto a seat 59. In the same way, the second valve 51 happens to be in a first state when the plunger 56 presses the ball 57 onto a seat 60 whereas this valve happens to be in a second state when the plunger 55 presses this ball onto a seat 61.

The pipeline 46 supplies chambers located facing the ends of the plungers 52 and 56 which do not act on the balls of the valves with a high pressure fluid. Thus, the valves 50 and 51 happen to be in their first state when a high pressure reigns in the pipeline 46. The pipeline 26, in this state, communicates with the pipeline 35 across the seat 59 of the valve 50 whereas the pipeline 44 communicates with the pipeline 5 via the seat 61 and the openings 62 in the seat 60 of the valve 51, a chamber 63 where the plungers 53, 55 slide and a passage 64 which opens out into an annular chamber 65 hollowed out in the body of the valve means, chamber to which the pipeline 5 is connected for supplying the brake circuit.

A spring 66 located in the chamber 63 tends to spread the plungers 53 and 55 apart one from the other in order that they push back the balls 54 and 57 against the seats 59 and 61 respectively. When the pressure of the fluid in the pipeline 46 falls below a predetermined value, which is significant of a failure of the high pressure circuit due, for example to a failure of the source itself or to leaks in the circuit, the loading developed by the plungers 53 and 55 on the balls 54 and 57 respectively, exceeds that developed on these same balls by the plungers 52 and 56. Thus the balls 54 and 57 seal the seats 59 and 61. The valves 50 and 51 are then in their second state for which the pipeline 26 leading to the master cylinder is cut off from the pipeline 35 which supplies the distributor 2 whereas the pipeline 44 coming from the distributor is cut off from the pipeline 5 for the supply of the braking circuit. On the other hand, the pipelines 26 and 5 are connected one to the other via the orifice of the seat 58, by the chamber 63, by the passage 64 and by the annular chamber 65. Thus, the master cylinder is connected directly to the braking circuit in the event of failure of the high pressure circuit.

The operation of the hydraulic braking device according to the invention is now described. When the brake pedal is pressed and when the pressure in the high pressure circuit exceeds the predetermined value, the pressure in the chamber 13 of the master cylinder 1 is transmitted by the pipelines 26 and 35 to the chamber 34 of the distributor 2, thus to move the control piston 31 and the slide valve 38 which in its turn moves the needle-pointed core 42 towards the right to open the valve 43. The high pressure fluid from the HP source then passes in the pipeline 44. Simultaneously, the same high pressure fluid actuates, via the pipeline 46, the plungers 52 and 56 which keep the valves 50 and 51 in their first state. In this state, as was seen above, the pipelines 26 and 35 communicate, as well as the pipelines 44 and 5. The booster high pressure supplied to the valve means 4 by the distributor 2 is thus sent along the pipeline 5 to activate the braking circuit normally through the modulator group 6, in the case where, for example the braking device is fitted with an anti-skid system and, from there, the brake motor 8.

When the pressure on the brake pedal is released, the pistons 10 and 11 of the master cylinder 1 slide back towards the left, as seen in FIG. 1, which has the effect of reopening the valves 18 and 19, the pressure of the fluid in the chamber 13 then falling and this pressure being transmitted by the pipelines 26 and 35 to the chamber 34 of the distributor. The control piston 31 then slides back towards the left as well as the slide valve 38, which allows the needle-pointed core 42 to come to a stop against a transverse surface 70 of the sleeve 37, the ball 41 then lifting from the opening near the channel 40. This channel places the pipelines 5 and 44 in communication with a reservoir of low pressure fluid 71 in order that the pressure in the braking circuit is able to fall again.

According to the invention, the pressure in the pipeline 46 falls below the predetermined value in the event of failure of the high pressure circuit. The plungers 52 and 56 are then no longer loaded against the balls 54 and 57 with a force sufficient to be held up against the seats 58 and 60 respectively, in opposition to the action of the plungers 53 and 55. These thus press the balls 54 and 57 against the seats 59, 61. The valves 50, 51 are then in their second state corresponding to the placing in communication of the pipelines 26 and 5 via the orifice of the seat 58, the chamber 63, the passage 64 and the annular chamber 65. Simultaneously, the pipelines 35 and 44 are cut.

If the driver then exerts a pressure on the brake pedal, the master cylinder will act directly on the braking circuit thus taking the place of the booster high pressure fluid distributor 2, then faulty.

The present invention thus provides a boosted braking device fitted with an individualized valve means capable of ensuring the safety of operation of the device in the event of failure of the high pressure circuit. This valve means may be fitted in a boosted braking device having a master cylinder and booster high pressure fluid distributor by simple addition. It is suitable more especially for such a device fitted also with an anti-skid system for vehicle wheels.

We claim:

1. A two-state braking device comprising:

a master cylinder controlled by a pedal;

a braking circuit supplying at least one brake motor;

a high pressure fluid circuit;

a high pressure fluid distributor having an inlet orifice connected to said high pressure fluid circuit, an outlet orifice and a control chamber; and valve means controlled by said high pressure fluid circuit to change from a first state corresponding to normal operation to a second state in case of failure of said high pressure fluid circuit, said valve means comprising a first valve which in the first state connects said master cylinder to said control chamber in order to connect said inlet and outlet orifices when said pedal is actuated and to isolate said master cylinder from said braking circuit, and, in a second state, connects said master cylinder to said braking circuit and isolates said control chamber from said master cylinder, and a second valve which in the first state connects said outlet orifice to said braking circuit and, in the second state, isolates said outlet orifice from said braking circuit.

2. The two-state braking device according to claim 1, wherein said first and second valves comprise:

first and second balls each of which is movable between first and second seats corresponding to the first and second states, respectively, first and second plungers actuated by said high pressure fluid circuit to push said balls to said first seats in the first state, and third and fourth plungers located between said balls and loaded by a spring placed between said third and fourth plungers to push said balls to said second seats in the second state.

3. The two-state braking device according to claim 2, wherein said plungers and said balls of said valve means are contained together in a cylindrical valve body the axis of which marks a line of action of the plungers on said balls.

4. The two-state braking device according to claim 3, wherein the second ball engages the associated first seat during normal operation, the associated first seat having openings thereabout permitting fluid flow between the outlet orifice and braking circuit.

5. The two-state braking device according to claim 3, wherein the first plunger is displaced into engagement with the first ball by means of high pressure fluid received from the high pressure fluid circuit via the distributor.

6. The two-state braking device according to claim 3, wherein the third plunger moves the first ball from the associated first seat to the associated second seat and permits fluid pressure from the master cylinder to communicate through the cylindrical valve body to the braking circuit.

7. The two-state braking device according to claim 6, wherein each of the third and fourth plungers includes an enlarged diameter portion received slidably in a bore of the cylindrical valve body, each enlarged diameter portion having a fluid opening and the portions biased apart by the spring.

8. The two-state braking device according to claim 6, wherein each of the first and second plungers includes a piston end having a seal thereabout and displaced by the high pressure fluid.

* * * * *